United States Patent [19]
Venugopal et al.

[11] Patent Number: 5,849,433
[45] Date of Patent: Dec. 15, 1998

[54] POLYMER BLEND ELECTROLYTE SYSTEM AND ELECTROCHEMICAL CELL USING SAME

[75] Inventors: Ganesh Venugopal, Duluth; Anaba A. Anani, Lawrenceville; John Moore, Stone Mountain; Simon Thomas, Lawrenceville, all of Ga.

[73] Assignee: Motorola, Inc., Schaumuburg, Ill.

[21] Appl. No.: 813,398

[22] Filed: Mar. 10, 1997

[51] Int. Cl.⁶ .................................................. H01M 10/40
[52] U.S. Cl. ............................................ 429/190; 429/192
[58] Field of Search ..................................... 429/190, 192

[56] References Cited

U.S. PATENT DOCUMENTS

| | | | |
|---|---|---|---|
| 4,562,511 | 12/1985 | Nishino et al. ......................... | 361/324 |
| 4,731,304 | 3/1988 | Lundquist et al. ...................... | 429/62 |
| 5,240,655 | 8/1993 | Troffkin et al. ........................ | 264/28 |
| 5,631,103 | 5/1997 | Eschbach et al. ...................... | 429/190 |
| 5,639,573 | 6/1997 | Oliver et al. .......................... | 429/190 |
| 5,645,958 | 7/1997 | Zhang et al. .......................... | 429/192 |
| 5,665,265 | 9/1997 | Gies et al. ............................ | 429/190 X |

*Primary Examiner*—Stephen Kalafut
*Attorney, Agent, or Firm*—Felipe J. Farley

[57] ABSTRACT

An electrochemical cell (10) includes first and second electrodes (12) and (14) with an electrolyte system (26) disposed therebetween. The electrolyte system is fabricated of a blend of differing grades of a single polymer. One grade may be provided to, for example, absorb an electrolyte active species, while the second grade may be provided to enhance mechanical integrity of the system.

30 Claims, 4 Drawing Sheets

POLYMER BLEND ELECTROLYTE SYSTEM AND ELECTROCHEMICAL CELL USING SAME

CROSS REFERENCE TO RELATED APPLICATIONS

This application is related to commonly assigned, co-pending patent application Ser. No. 08/803,611, filed Feb. 27, 1997, in the names of Venugopal, et al, entitled POLYMERIC ELECTROLYTE SYSTEM AND ELECTROCHEMICAL CELL USING SAME, (Attorney docket no. EN10574).

TECHNICAL FIELD

This invention relates in general to the field of electrolytes for electrochemical cells, and more particularly to electrochemical cells using polymer gel electrolytes.

BACKGROUND OF THE INVENTION

There has been a great deal of interest in developing better and more efficient methods for storing energy for applications such as cellular communication, satellites, portable computers, and electric vehicles to name but a few. Accordingly, there have been recent concerted efforts to develop high energy, cost effective batteries having improved performance characteristics.

Rechargeable or secondary cells are more desirable than primary (non-rechargeable) cells since the associated chemical reactions which take place at the positive and negative electrodes of the battery are reversible. Electrodes for secondary cells are capable of being recharged by the application of an electrical charge thereto. Numerous advanced electrode systems have been developed for storing electrical charge. Concurrently much effort has been dedicated to the development of electrolytes capable of enhancing the capabilities and performance of electrochemical cells.

Heretofore, electrolytes have been either liquid electrolytes as are found in conventional wet cell batteries, or solid films as are available in newer, more advanced battery systems. Each of these systems have inherent limitations and related deficiencies which make them unsuitable for various applications. Liquid electrolytes, while demonstrating acceptable ionic conductivity, tend to leak out of the cells into which they are sealed. While better manufacturing techniques have lessened the occurrence of leakage, cells still do leak potentially dangerous liquid electrolytes from time to time. Moreover, any leakage in the cell lessens the amount of electrolyte available in the cell, thus reducing the effectiveness of the device.

Solid electrolytes are free from problems of leakage, however, they have traditionally offered inferior properties as compared to liquid electrolytes. This is due to the fact that ionic conductivities for solid electrolytes are often one to two orders of magnitude poorer than for liquid electrolytes. Good ionic conductivity is necessary to insure a battery system capable of delivering usable amounts of power for a given application. Most solid electrolytes have not heretofore been adequate for many high performance battery systems.

One class of solid electrolytes, specifically gel electrolytes, have shown great promise for high performance battery systems. Gel electrolytes contain a significant fraction of solvents and/or plasticizers in addition to the salt and polymer of the electrolyte itself. One processing route that can be used to assemble a battery with a gel electrolyte is to leave the electrolyte salt and solvent out of the polymer gel system until after the cell is completely fabricated. Thereafter, the solvent and the electrolyte salt may be introduced into the polymer system in order to swell and activate the battery. While this approach (which is described in, for example, U.S. Pat. No. 5,456,000 issued Oct. 10, 1995) has the advantage of allowing the cell to be fabricated in a non-dry environment (the electrolyte salt in a lithium cell is typically highly hygroscopic) it offers problems with respect to performance and assembly. First, the gel electrolyte may lack sufficient mechanical integrity to prevent shorting between the electrodes while they are being bonded or laminated together with the gel electrolyte. The gel electrolyte layer thickness is reported to be 75 $\mu$m, presumably to overcome this shorting problem and to help facilitate handling of the electrolyte material. When compared to the 25 $\mu$m typical thickness for separators used in liquid lithium ion cells, this results in a significant reduction in the volumetric energy density for the cell.

Successful solutions to these problems are taught in, for example, commonly-assigned, co-pending patent application Ser. Nos. 08/718,032 filed Sep. 23, 1996, now U.S. Pat. No. 5,681,357, and 08/720,062 filed Sep. 27, 1996, now U.S. Pat. No. 5,631,103, both to Eschbach, et al, which each disclose processes in which a first polymeric material is coated with layers of a second polymeric material. However, the commercial feasibility of these processes and structures is unproven, and the associated manufacturing costs are not known.

Accordingly, there exists a need for a new polymer electrolyte system which combines the properties of good mechanical integrity, as well as the ability to absorb sufficient amounts of an electrolyte active species so as to produce an electrolyte system with the high ionic conductivity characteristic of liquid electrolytes. The electrolyte so formed should be relatively easy to produce, without need for complex manufacturing processes.

DETAILED DESCRIPTION OF THE PREFERRED EMBODIMENT

Figure 1:
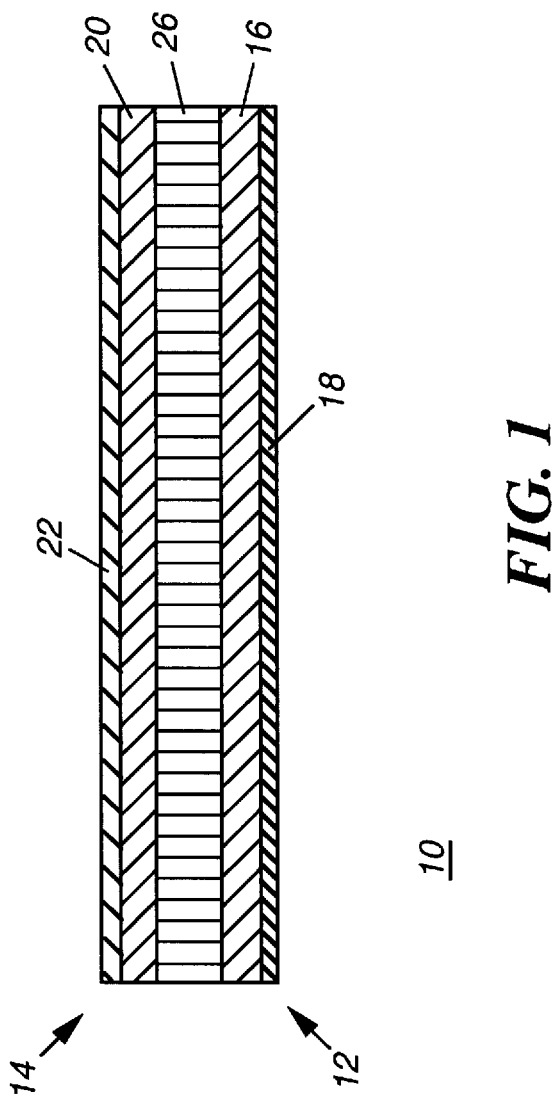
FIG. 1 is a cross sectional side view of an electrochemical cell in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a cross sectional side view of an electrochemical cell having a blended polymer electrolyte system, in accordance with the instant invention. The cell 10 includes first and second electrodes 12 and 14 respectively. The first electrode may be, for example, an anode in a lithium rechargeable cell. Accordingly, the anode may be fabricated of any of a number of different known materials for lithium rechargeable cells, examples of which include metallic lithium, lithium, lithium alloys, such as lithium:aluminum, and lithium intercalation materials such as carbon, petroleum coke, activated carbon, graphite, and other forms of carbon known in the art. In one preferred embodiment, the anode 12 is fabricated of an amorphous carbonaceous material such as that disclosed in commonly assigned, co-pending U.S. patent application Ser. No. 08/561,641 entitled "Improved Carbon Electrode Materials For Lithium Battery Cells And Method of Making Same" filed on Nov. 22, 1995, now U.S. Pat. No. 5,635,151, in the names of Jinshan Zhang, et al., the disclosure of which is incorporated herein by reference.

More particularly, the anode 12 comprises a layer of active material 16 such as a carbon material as described hereinabove deposited on a substrate 18. Substrate 18 may be any of a number of materials known in the art, examples of which include copper, gold, nickel, copper alloys, copper plated materials, and combinations thereof. In the embodiment of FIG. 1, the substrate 18 is fabricated of copper.

The second electrode 14 may be adapted to be the cathode of a lithium rechargeable cell. In such an instance, the cathode is fabricated of the lithium intercalation material such as is known in the art, examples of which include lithiated magnesium oxide, lithiated cobalt oxide, lithiated nickel oxide, and combinations thereof. In one preferred embodiment, the cathode 14 is fabricated of a lithiated nickel oxide material such as is disclosed in commonly assigned, co-pending U.S. patent application Ser. No. 08/464,440 in the name of Zhenhua Mao filed Jun. 5, 1995, now U.S. Pat. No. 5,591,548, the disclosure of which is incorporated herein by reference.

More particularly, the cathode 14 comprises a layer of the cathode active material 20 disposed on a cathode substrate 22. The cathode material 20 maybe such as that described hereinabove, while the substrate may be fabricated from any of a number of known materials known in the art, examples of which include aluminum, nickel, and combinations thereof. In one preferred embodiment, substrate 22 is fabricated of aluminum.

Disposed between electrodes 12 and 14 is a polymeric electrolyte material system 26. The electrolyte system 26 comprises an electrolyte active species and a polymer blend support structure fabricated of a blend of at least first and second different grades of a similar polymer material. For example, the polymer blend gel support structure can comprise at least first and second grades of a similar polymer material, the first and second grades having differing physical characteristics. The differing physical characteristics can include, for example, crystallinity, melting point, molecular weight, composition, porosity, and combinations thereof, to name a few. Of course, one of ordinary skill will understand that some of these characteristics are interdependent. For example, by changing composition & molecular weight one would be able to get materials with different crystallinities and melting points. High molecular weights in certain types of polymers (e.g., poly vinylidene fluoride (PVDF)) tend to give lower crystallinities which in turn leads to lower melting points.

Preferred materials from which to select the polymer material include poly(vinylidene fluoride), polypropylene, polyethylene, polytetrafluoroethylene, polyethyleneterephthalate, poly(hexafluoro propylene), polystyrene, ethylene propylene diene monomer, nylon, polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof. In one preferred embodiment, the polymeric support structure is fabricated of poly (vinylidene fluoride), in which for example, the crystallinity of one of the grades is greater than that of the other grade.

More particularly, a first grade of polymer may be fabricated of at least about 40 weight % crystalline polyvinylidene fluoride. Accordingly, the second grade may be fabricated of polyvinylidene fluoride which is less than or equal to 40 weight % crystalline. Third or subsequent additional grades of polymer material may be added to the polymer blend having similar or differing physical characteristics.

The electrolyte active species is a liquid or solid component (or both) which provides ionic conductivity between the anode and the cathode. In the embodiment in which the electrochemical cell 10 is a lithium intercalation cell, the electrolyte active species consists of an alkali metal salt in a solvent. Typical alkali metal salts include, but are not limited to, salts having the formula $M^+X^-$ where $M^+$ is an alkali metal cation such as $Li^+$, $Na^+$, $K^+$, and combinations thereof; and $X^{31}$ is an anion such as. $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $N(CF_3SO_2)_2^-$, $C(CF_3SO_2)_2^-$ and combinations thereof. The solvent into which the salt is dispersed is typically an organic solvent including, but not limited to, propylene carbonate (PC), ethylene carbonate (EC), diethyl carbonate (DEC), dimethyl carbonate (DMC), dipropylcarbonate, dimethylsulfoxide, acetonitrile, dimethoxyethane, tetrahydrofuran, n-methyl-2-pyrrolidone (NMP), acetone and combinations thereof. For other electrode combinations, i.e., Ni-Cd or Ni-metal hydride, other electrolyte active species may be used, such as KOH.

The first grade of the polymer material is also, as described above by physical characteristics, substantially non-gelling: That is the polymer will not form a gel in the presence of one or more solvent materials used in electrochemical cells, or if it does, gelling does not occur until after temperatures greater than the temperatures at which the second grade of polymer material gels. As the first grade of polymer material is comparatively non-gelling, it is hence provided to enhance the mechanical strength or integrity of the polymer electrolyte system. The second grade of polymer material is a gelling, polymer electrolyte carrier material adapted to absorb the electrolyte active species. The gel-forming grade is preferably fabricated of a low crystallinity poly(vinylidene fluoride) (PVDF).

One or both grades of the polymer material or indeed the entire blend, may also include a filler material so as to, for example, enhance mechanical integrity. Exemplary filler materials include, hollow glass microspheres, amorphous silica, alumina, calcium carbonate, and combinations thereof. Other plastic fillers like polyethylene, polypropylene, polytetrafluoroethylene, polystyrene, polyethyleneterephthalate, ethylene propylene diene monomer, nylon, hollow plastic microspheres and combinations thereof could also be used. As a further enhancement, the filler material may be a flame retardant filler material.

Another advantage of the structure illustrated and described herein relates to the fact that the second grade of polymer material will, due to the lower crystallinity, have better gelling properties than the first grade. This will allow the second grade to adhere well to the electrodes of an electrochemical cell into which the electrolyte structure may be incorporated. The low, or even zero degree of gelation of the first grade allows it to maintain a robust, microporous structure within the overall structure.

Figure 2:
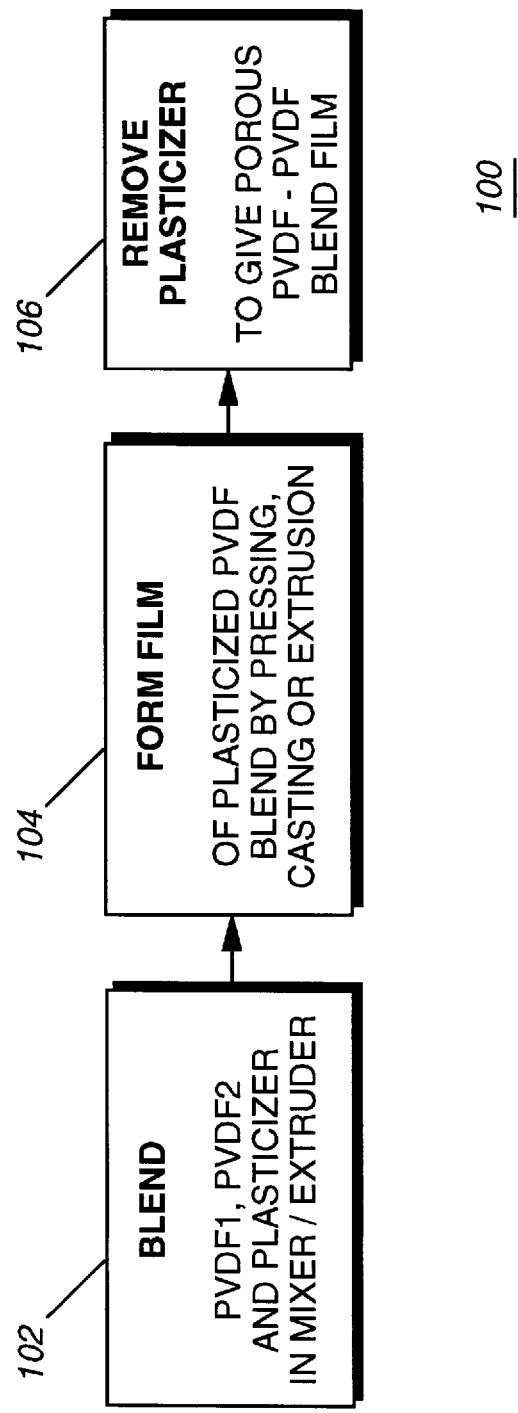
FIG. 2 is a flow chart illustrating a method for processing an electrolyte structure in accordance with the invention.

Referring now to FIG. 2, there is illustrated therein a simplified flow chart of the steps that may be taken to fabricated an electrolyte structure in accordance with the instant invention. The flowchart 100 illustrates the process for fabricating a polymer blend gel electrolyte support structure, wherein two grades of substantially the same polymer materials are blended, but wherein the two grades have substantially different physical characteristics. The step of preparing the blend of, for example, high porosity and/or low crystallinity polymer, i.e., PVDF, with low porosity and/or high crystallinity PVDF is illustrated by box 102. Box 102 includes the steps of blending the polymer grades with an appropriate plasticizer, such as dibutyl phthalate, diethyl phthalate, propylene carbonate, ethylene carbonate, and combinations thereof. The blend is then extruded (i.e., mixed and film forming together. Usually the mixing is done in the barrel of the extruder, while the film is formed when the molten mixture is pushed out of a slit-type die, followed by a "blown film" process. A small scale process may mix using a Haake torque rheometer and do the film forming with two presses all in a manner well known in the art.

The polymer blend prepared and extruded at step 102 is then formed into a film at steps 104. Films may be formed by any of a number of known techniques, examples of which include pressing, casting or further extrusion, all as are well known in the art. Plasticizer is then removed from the polymer blend film structure at step 106. Plasticizer is removed by exposing the film to a solvent extraction medium. Specifically, the laminated structure may be dipped in isopropanol for a period of time sufficient to dissolve out the plasticizer. Thereafter, the residual isopropanol may be dried, i.e., removed, by placing the film in an oven at 60° C.

The invention may be better understood from a perusal of the examples of which are attached hereto.

EXAMPLES

Example I

Making the PVDF Blend Separator

About 28 grams (g) of PVDF known as Kynar 301 F, purchased from Elf ATOCHEM, Inc. and having a crystallinity of around 45 weight %, and 14 g of PVDF known as Kynar 461 purchased from Elf ATOCHEM, Inc. and having a crystallinity of around 40 weight %, and 33 g of dibutyl phthalate (DBP) were mixed in a Haake Torque Rheometer at around 180° C. The resulting mixture was hot pressed into a film using a Caver press at around 200° C. for about 3 minutes and then cooled under pressure in a separate Carver press. The plasticizer from the film was extracted by dipping in isopropanol. The sheets were then dried in an oven at 60° C. to remove excess isopropanol. Other blended PVDF separator films, for example Kynar 461/Solef 1006, Kynar 2801/Solef 1006 and Kynar 461/Solef 1012, (all as specified below in Table I) were also made in a similar fashion.

TABLE I

| Grade | Xtallinity (wt %) | Melting Temp (°C.) |
|---|---|---|
| Kynar 301F | ~45% | 163° C. |
| Solef 1012 | ~63% | 173° C. |
| Solef 1006 | ~64% | 176° C. |

TABLE I-continued

| Grade | Xtallinity (wt %) | Melting Temp (°C.) |
|---|---|---|
| Kynar 461 | ~40% | 159° C. |
| Kynar 2801 (copolymer) | <40% | 148° C. |

Example II

Cell containing a PVDF Blend Separator

Figure 3:
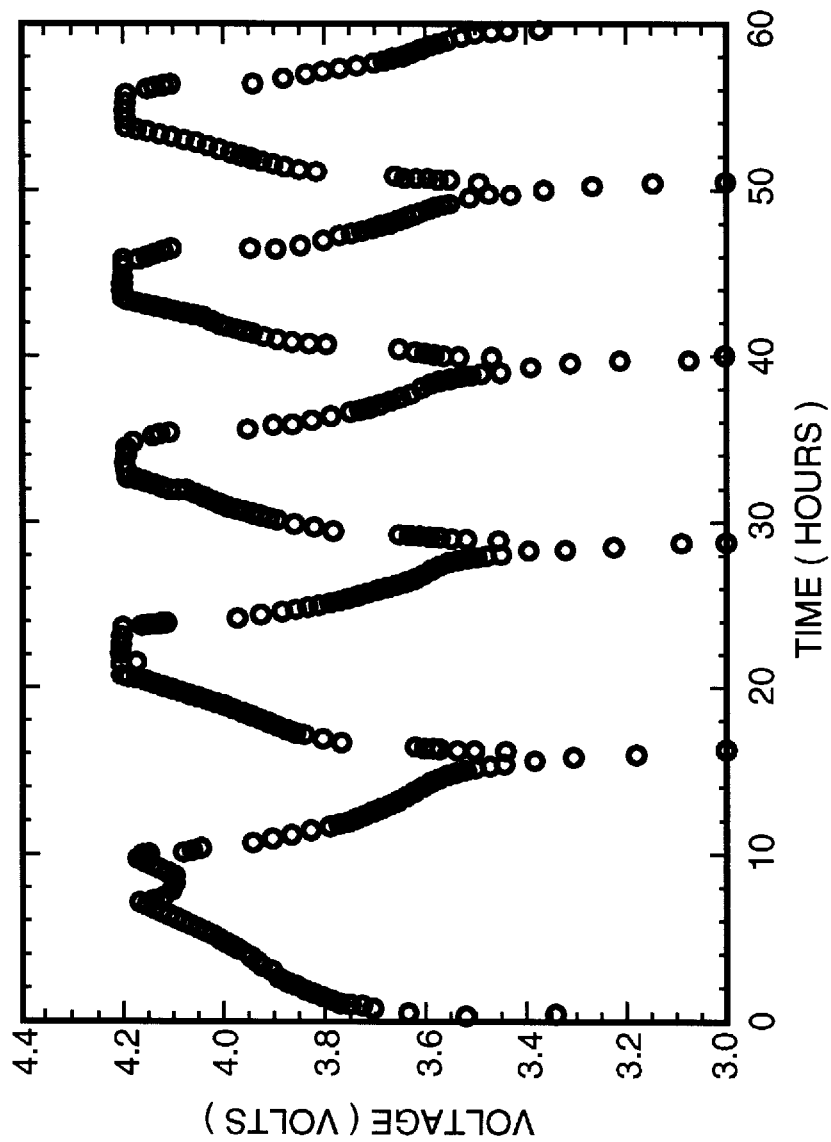
FIG. 3 is a charge/discharge profile, for the first five cycles, of an electrochemical cell having an electrolyte system, in accordance with the instant invention.
Figure 4:
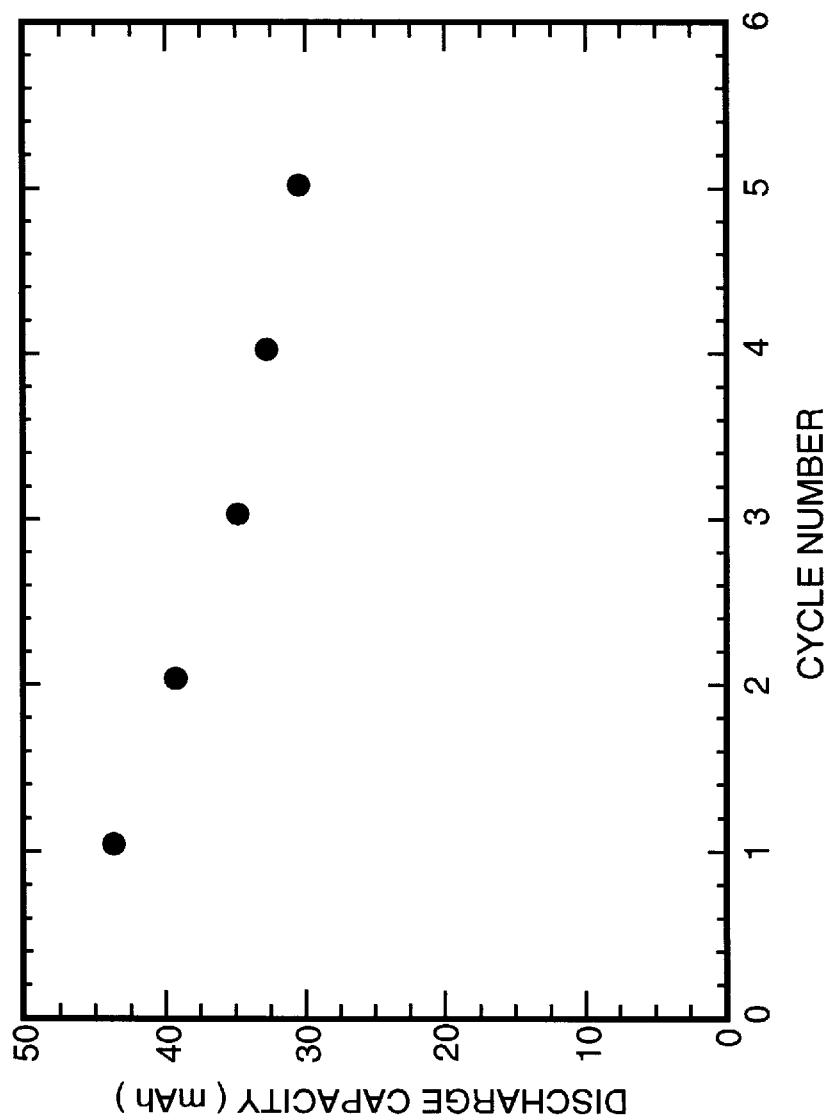
FIG. 4 is a chart which shows the capacity vs. cycle number plot for the first five cycles of the device described in Example II.

A 50 mAh lithium-ion polymer flat cell made using the Kynar 461/Kynar 301F PVDF blend described in Example I. Commercially available lithium cobalt oxide (LiCoO2) was used as the active material in the cathode, while commercially available graphite (SFG44) was the active material in the anode. Liquid electrolyte, a 1 M solution of lithium hexafluorophosphate (LiPF6) in a mixture containing 40:60 by weight ratio of ethylene carbonate (EC) and diethyl carbonate (DEC), was added to the cell during the stacking operation. The cell was packaged in an aluminum foil laminate pouch, gelled for 2 or 3 minutes at 90° C. and then cooled to room temperature, between two stainless steel plates. The cell was cycled using the protocol setup for cycling standard 50 mAh labsize flat cells. Charge and discharge currents were both 8 milliamps (mA). FIG. 3 shows the charge—discharge profiles for the first five cycles, while FIG. 4 shows the capacity vs. cycle number plot for the first five cycles. Using the blended polymer system in accordance with the instant invention, it is clear that a working electrochemical cell may be realized.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A polymer gel electrolyte system for use in an electrochemical cell comprising a polymer blend gel electrolyte support structure fabricated of a blend of at least first and second different grades of a single polymer material.

2. An electrolyte system as in claim 1, wherein said first and second grades having differing physical characteristics.

3. An electrolyte system as in claim 1, wherein said first and second grades have differing degrees of porosity.

4. An electrolyte system as in claim 1, wherein said first and second grades have differing degrees of crystallinity.

5. An electrolyte system as in claim 1, wherein said polymer material is selected from the group consisting of poly(vinylidene fluoride), polypropylene, polyethylene, poly (hexafluoro propylene), polytetrafluoroethylene, polyethyleneterephthalate, polystyrene, ethylene propylene diene monomer, nylon, polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof.

6. An electrolyte system as in claim 1, wherein said first grade is fabricated of at least about 40 weight % crystalline polyvinylidene fluoride and said second grade is fabricated of less than about 40 weight % crystalline polyvinylidene fluoride.

7. An electrolyte system as in claim 1, further including an electrolyte active species dispersed through polymer gel blend support structure.

8. An electrolyte system as in claim 7, wherein said electrolyte active species comprises an electrolyte salt dispersed in an organic solvent.

9. An electrolyte system as in claim 8, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, nmethyl-2-pyrrolidone, and combinations thereof.

10. An electrolyte system as in claim 9, wherein the anions of said electrolyte salt is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof.

11. An electrolyte system as in claim 1, further including a filler material dispersed in said polymer gel blend support structure.

12. An electrolyte system as in claim 11, wherein said filler material is selected from the group consisting of hollow glass microspheres, amorphous silica, alumina, calcium carbonate, polyethylene, polypropylene, polytetrafluoroethylene, polystyrene, polyethyleneterephthalate, ethylene propylene diene monomer, nylon, hollow plastic microspheres, and combinations thereof.

13. An electrolyte system as in claim 11, wherein said filler material is a flame retarding filler material.

14. An electrochemical cell, comprising:

an anode;

a cathode; and an electrolyte system comprising a polymer blend gel electrolyte support structure fabricated of a blend of at least first and second different grades of a single polymer material, and having dispersed therein an electrolyte active species.

15. An electrochemical cell as in claim 14, wherein said electrolyte active species comprises an electrolyte salt dispersed in an organic solvent.

16. An electrochemical cell as in claim 15, wherein said organic solvent is selected from the group consisting of propylene carbonate, ethylene carbonate, diethyl carbonate, dimethyl carbonate, dipropylcarbonate, dimethylsulfoxide, acetonitrile, dimethoxyethane, tetrahydrofuran, n-methyl-2-pyrrolidone, and combinations thereof.

17. An electrochemical cell as in claim 15, wherein the anions of said electrolyte salt is selected from the group consisting of $Cl^-$, $Br^-$, $I^-$, $ClO_4^-$, $BF_4^-$, $PF_6^-$, $ASF_6^-$, $SbF_6^-$, $CH_3CO_2^-$, $CF_3SO_3^-$, $N(CF_3SO_2)_2^-$, $C(CF_3SO_2)_2^-$ and combinations thereof.

18. An electrochemical cell as in claim 14, wherein said anode is fabricated of a carbon based material.

19. An electrochemical cell as in claim 14, wherein said cathode is fabricated of a lithiated transition metal oxide.

20. An electrochemical cell as in claim 14, wherein said polymer material is fabricated of a material selected from the group consisting of poly (vinylidene fluoride), polyurethane, polyethylene oxide, poly (hexafluoro propylene), polyacrylonitrile, polymethylacrylate, polyacrylamide, polyvinylacetate, polyvinylpyrrolidone, polytetraethylene glycol diacrylate, polypropylene, polyethylene, polytetrafluoroethylene, polyethyleneterephthalate, polystyrene, ethylene propylene diene monomer, nylon, copolymers of any of the foregoing, and combinations thereof.

21. An electrochemical cell as in claim 14, wherein said first grade of said polymer material is fabricated of polyvinylidene fluoride which is at least about 40 weight % crystalline, and said second grade of said polymer is fabricated of poly (vinylidene fluoride) which is less than about 40 weight % crystalline.

22. An electrochemical cell as in claim 14, further including a filler material dispersed in said polymer gel blend support structure.

23. An electrochemical cell as in claim 22, wherein said filler material is selected from the group consisting of hollow glass microspheres, amorphous silica, alumina, calcium carbonate, polyethylene, polypropylene, polytetrafluoroethylene, polystyrene, polyethyleneterephthalate, ethylene propylene diene monomer, nylon, hollow plastic microspheres, and combinations thereof.

24. An electrolyte system as in claim 23, wherein said filler material is a flame retarding filler material.

25. A polymer gel electrolyte system for use in an electrochemiocal cell comprising a polymer blend gel electrolyte support structure fabricated of a blend of at least first and second different grades of a single polymer material, said first and second grades having differing physical characteristics, said polymer gel electrolyte support structure having an electrolyte active species dispersed therein.

26. An electrolyte system as in claim 25, wherein said first and second grades have differing degrees of crystallinity.

27. An electrolyte system as in claim 26, wherein said polymer material is selected from the group consisting of poly(vinylidene fluoride), polypropylene, polyethylene, poly(hexafluoro propylene), polytetrafluoroethylene, polyethyleneterephthalate, polystyrene, ethylene propylene diene monomer, nylon, polyurethane, polyethylene oxide, polyacrylonitrile, polymethylacrylate, polyacrylamide, polyvinylacetate, polyvinylpyrrolidone, polytetraethylene glycol diacrylate, copolymers of any of the foregoing, and combinations thereof.

28. An electrolyte system as in claim 25, wherein said first grade is fabricated of at least about 40 weight % crystalline polyvinylidene fluoride and said second grade is fabricated of less than about 40 weight % crystalline polyvinylidene fluoride.

29. An electrolyte system as in claim 25, further including a filler material dispersed in said polymer gel blend support structure.

30. An electrolyte system as in claim 29, wherein said filler material is a flame retarding filler material.

\* \* \* \* \*